(12) United States Patent
Chu et al.

(10) Patent No.: US 8,762,763 B2
(45) Date of Patent: Jun. 24, 2014

(54) SINGLE-WIRE TRANSMISSION INTERFACE AND METHOD OF TRANSMISSION THROUGH SINGLE-WIRE

(75) Inventors: Kwan-Jen Chu, Hsinchu (TW); Tsung-Wei Huang, Taipei (TW); Jien-Sheng Chen, Miaoli (TW); Pao-Hsun Yu, Hsinchu (TW)

(73) Assignee: Richtek Technology Corporation, Chupei, Hsin-Chu (TW)

( * ) Notice: Subject to any disclaimer, the term of this patent is extended or adjusted under 35 U.S.C. 154(b) by 783 days.

(21) Appl. No.: 12/460,540

(22) Filed: Jul. 21, 2009

(65) Prior Publication Data

US 2010/0054313 A1    Mar. 4, 2010

(30) Foreign Application Priority Data

Sep. 2, 2008    (TW) ................................ 97133623 A (51) Int. Cl.
*G06F 5/16*    (2006.01)
*G06F 9/32*    (2006.01)
*G06F 13/42*    (2006.01)

(52) U.S. Cl.
CPC .................................. *G06F 13/4291* (2013.01)
USPC ........... 713/500; 713/501; 713/502; 713/600; 370/229; 370/276; 398/67

(58) Field of Classification Search
USPC .......... 713/500, 502, 501, 600; 370/229, 276; 398/67
See application file for complete search history.

(56) References Cited

U.S. PATENT DOCUMENTS 5,883,582 A * 3/1999 Bowers et al. ............... 340/10.2
7,080,266 B2 * 7/2006 D'Angelo et al. ............ 713/300
7,127,631 B2 * 10/2006 D'Angelo et al. ............ 713/502

\* cited by examiner

*Primary Examiner* — Michael J Brown
(74) *Attorney, Agent, or Firm* — Tung & Associates (57) ABSTRACT

The present invention discloses a single-wire transmission interface, and a method of transmission through single-wire. The method comprises: providing a single-wire signal through a single-wire; and transmitting information only in a transmission period defined by a fixed first time period starting from one of a rising or a falling edge of the single-wire signal.

23 Claims, 8 Drawing Sheets

SINGLE-WIRE TRANSMISSION INTERFACE AND METHOD OF TRANSMISSION THROUGH SINGLE-WIRE

BACKGROUND OF THE INVENTION

1. Field of Invention

The present invention relates to a single-wire transmission interface and a method of transmission through single-wire; particularly, to a single-wire transmission interface for transmitting address and data, and a corresponding method.

2. Description of Related Art

Figure 1:
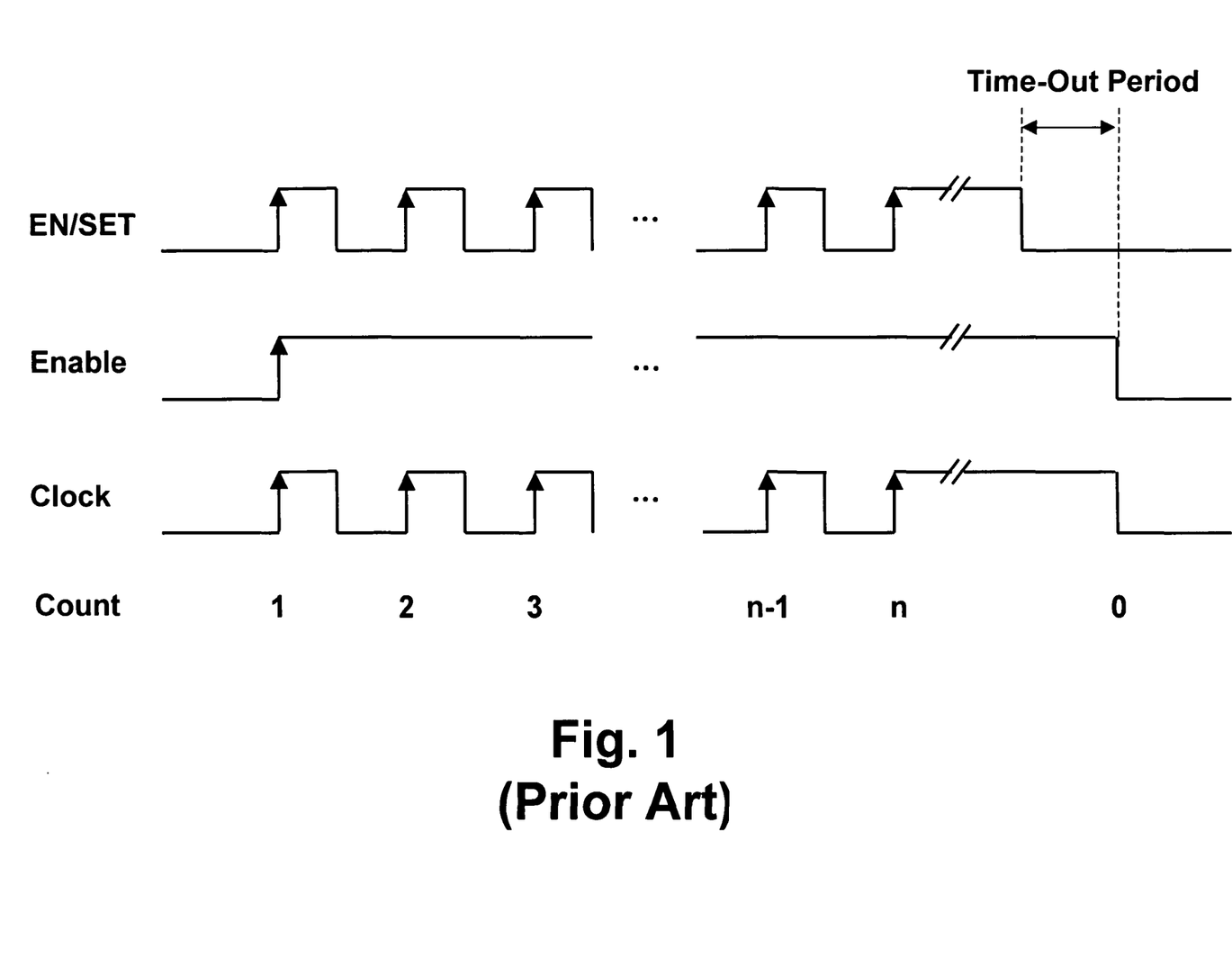
FIG. 1 shows a prior art method for single-wire serial transmission.

Current communication interfaces, such as I2C, SPI, and SMBUS, require at least two transmission wires: one for transmitting data and one for transmitting clock. If transmission of data and clock can be achieved by one single-wire, it will reduce the number of pins of an integrated circuit, which is a great advantage and even greater to an integrated circuit with lower pin number. To this end, U.S. Pat. Nos. 7,127,631 and 7,080,266 disclose a method for single-wire serial transmission. As shown in FIG. 1, this method indicates three states by: long term high, long term low, and alternating high/low, of an EN/SET signal transmitted through a single-wire. When a receiver side detects a rising edge of the EN/SET signal, it is enabled to start receiving data (as shown by the waveform Enable) and generates a clock (as shown by the waveform Clock) corresponding to the EN/SET signal; simultaneously, a counter at the receiver side starts counting the number of the rising edges of the EN/SET signal (1~n). When the receiver side detects a falling edge of the EN/SET signal, it starts counting a time-out period. If the receiver side does not detect a next rising edge within the time-out period, it will shut down the signal Enable, reset the counter, and the clock will stop accordingly.

In the foregoing prior art, it is unclear as to how it transmits the data "0", and each data transmission period does not have a fixed time length. The time period of the enable signal from ON to OFF varies, depending on the content of the data; this is not preferred in certain applications.

In view of the foregoing, the present invention provides a single-wire transmission interface capable of transmitting address and data in a fixed time period, and a corresponding method.

SUMMARY OF THE INVENTION

The first objective of the present invention is to provide a single-wire transmission interface.

The second objective of the present invention is to provide a method of transmission through single-wire.

In order to achieve the foregoing objectives, the present invention provides a single-wire transmission interface comprising: a decoder receiving a single-wire signal from a single-wire and generating decoded information corresponding to the single-wire signal; and a counter determining a transmission period by counting a fixed first time period according to one of a rising and a falling edge of the single wire signal; wherein the decoder operates to generate decoded information only in the transmission period.

In addition, the present invention also provides a method of transmission through single-wire, comprising: providing a single-wire signal through a single wire; and transmitting information only in a transmission period defined by a fixed first time period starting from or after one of a rising and a falling edge of the single-wire signal.

In the foregoing transmission interface and method, information of one binary bit may be transmitted in one transmission period, or information indicated by the number of occurrences of a level in the single wire signal may be transmitted in one transmission period.

In the foregoing transmission interface and method, information transmitted in multiple transmission periods may constitute an information series, wherein each information series may include an address and a data.

In the foregoing transmission interface and method, a fixed second time period may be counted after an occurrence of the other one of the rising and the falling edge of the single-wire signal. If the single-wire signal does not change its level in the second time period, the information transmitted in the next transmission period after the end of the second time period is an address.

In addition, an enable signal may be generated when or after the second time period ends.

The objectives, technical details, features, and effects of the present invention will be better understood with regard to the detailed description of the embodiments below, with reference to the drawings.

DESCRIPTION OF THE PREFERRED EMBODIMENTS

Figure 2:
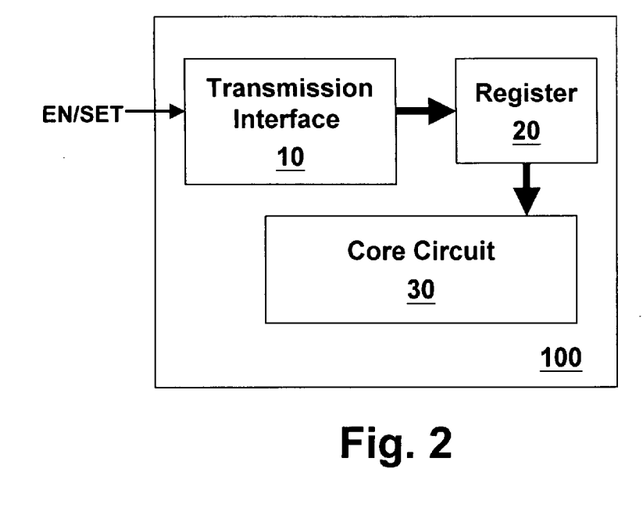
FIG. 2 and FIG. 3 show a hardware embodiment of the present invention.

Referring to FIG. 2, the present invention also refers to a signal transmitted through a single-wire as the EN/SET signal. An integrated circuit 100 at a receiver side includes: a transmission interface 10, a register 20, and a core circuit 30. The transmission interface 10 receives the EN/SET signal and generates decoded information (including address and/or data). The information is transmitted to a corresponding address in the register 20, and then is employed by the integrated circuit 100 for certain application, such as setting an upper limit for overvoltage protection in the core circuit 30, setting a current amount of an LED (Light Emitting Diode), etc., depending on the function of the integrated circuit 100.

Figure 3:
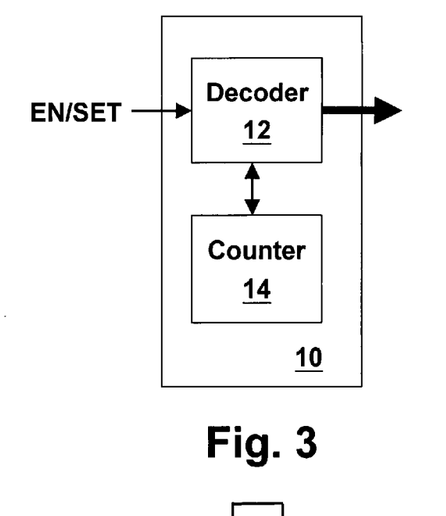
Figure 4:
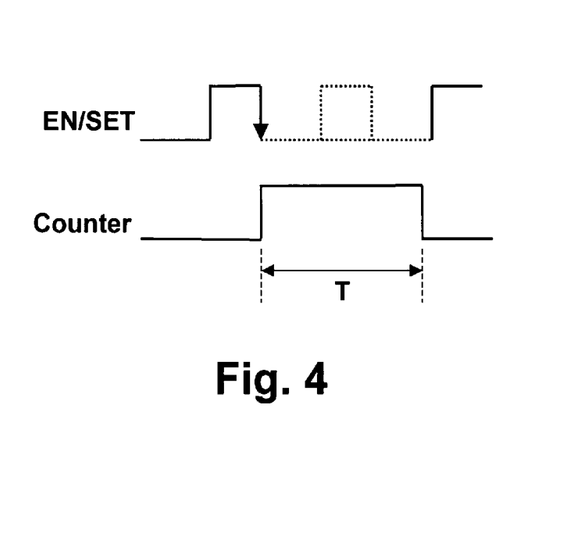
FIG. 4 illustrates defining the transmission period according to a time limit T.

Referring to FIG. 3, the transmission interface 10 includes a decoder 12 and a counter 14. The decoder 12 decodes the EN/SET signal received, and the counter 14 starts counting according to the EN/SET signal. FIG. 4 shows the relationship between the decoded information and a time period counted by the counter 14. The counter 14 starts to count a fixed time period T according to a falling edge of the EN/SET signal. In this time period, the EN/SET signal is available to transmit information (as shown by the dashed lines in FIG. 4). The EN/SET signal stops transmitting information as the counter 14 reaches the time limit T; it does not transmit information until the decoder 12 detects the falling edge of the EN/SET signal and initiates the counter 14 again. In the present invention, the transmission period of any information (including address and/or data) is fixed, which is the time period T.

Figure 5:
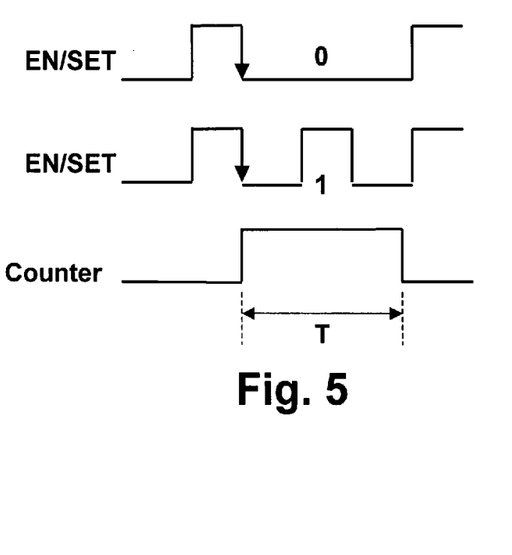
FIG. 5 shows an embodiment of the present invention.
Figure 6:
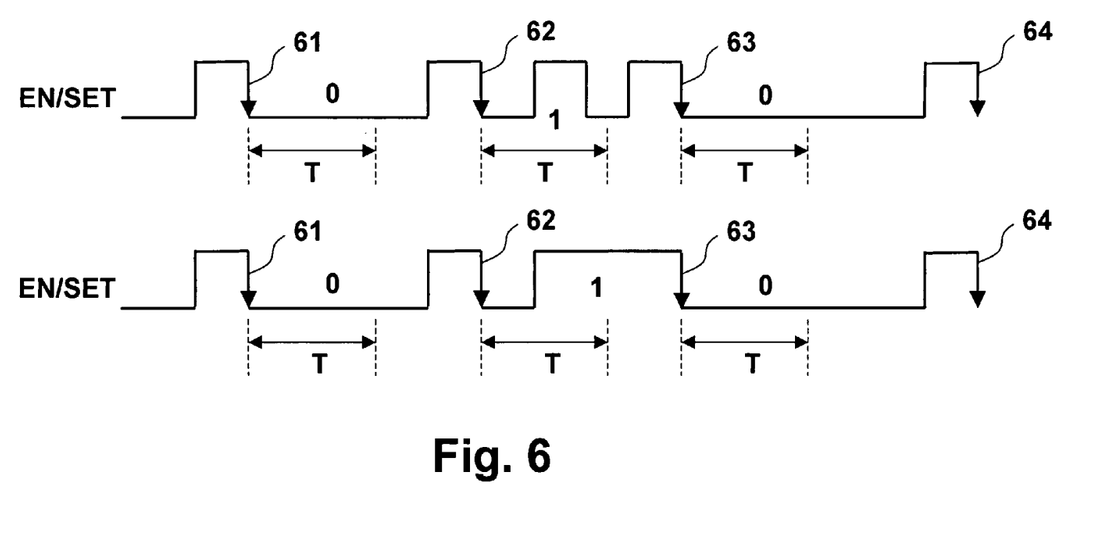
FIG. 6 indicates transmitting information 010, or transmitting 0, 1, 0 to three registers respectively.

With the abovementioned architecture, many transmission protocols are applicable. FIG. 5 shows one embodiment which transmits information of one binary bit in each transmission period. When there is no occurrence of a high level in the time period T, it indicates 0; when a high level occurs in the time period T, it indicates 1. Following this transmission protocol, multiple transmission periods may be used to express information of multiple bits, or to transmit information to multiple resisters respectively. FIG. 6 shows transmitting the information 010, or transmitting 0, 1, 0 to three registers respectively. Note that the information "1" can be expressed by either the upper or the lower wave form as shown in the figure. From the perspective of the receiver side, it is only required to receive information in the fixed time period T, regardless to the length between two falling edges of the EN/SET signal; for example as shown in the figure, the time periods between the falling edges 61 and 62, 62 and 63, and 63 and 64 are not identical.

Figure 7:
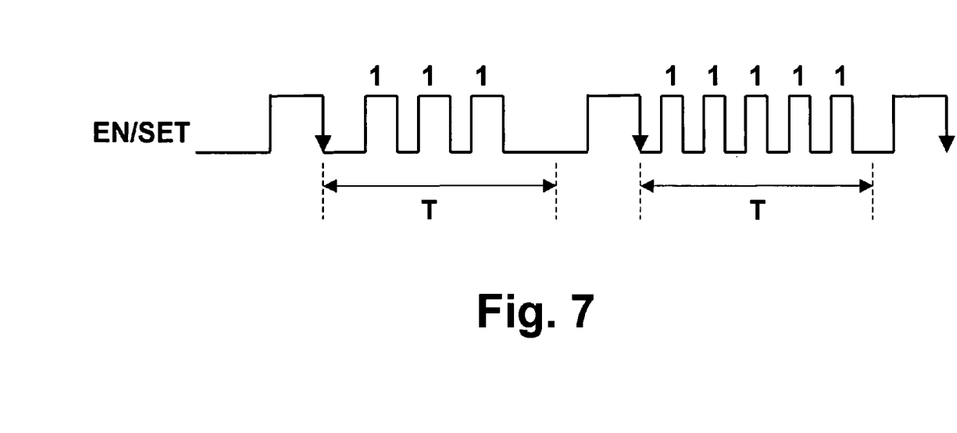
FIG. 7 shows another embodiment of the present invention.

FIG. 7 shows another embodiment of the present invention. In this embodiment, the information is expressed by the number of occurrences of the high level in the EN/SET signal in each transmission period. For example, the information transmitted in the first transmission period T is "3", and the information transmitted in the second transmission period T is "5", as shown in the figure. Similar to the previous embodiment, if there is no occurrence of the high level in the transmission period T, it indicates 0. Yet, in this transmission protocol, the information transmitted in each transmission period is not a binary bit. In this regard, a counter (not shown) maybe provided inside the decoder 12 in the transmission interface 10, such that the number of occurrences of the high level of the EN/SET signal can be converted to a binary number.

Figure 8:
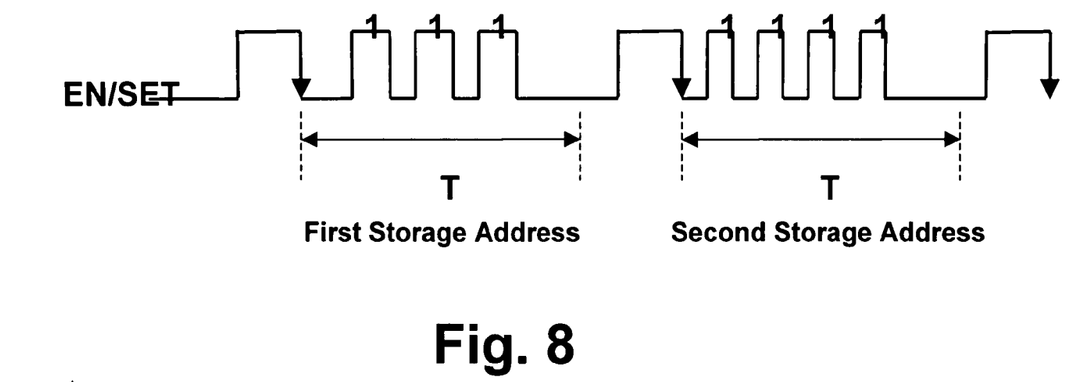
FIG. 8 shows a method for storing information to different register addresses in a sequential order in multiple transmission periods.

If the register 20 has multiple storage addresses (for example, each address stores different data for controlling a different function of the integrated circuit 100), the EN/SET signal can be used to set the different functions; that is, different data can be stored in different register addresses by the EN/SET signal according to the present invention. FIG. 8 shows another embodiment of the present invention, in which data is stored in a different register address in each transmission period in a sequential order. For example, in the first transmission period T, data "3" is transmitted to the first storage address; in the second transmission period T, data "4" is transmitted to the second storage address; and in the transmission period next to the second transmission period, data is transmitted to the next storage address, as show in the figure.

Figure 9:
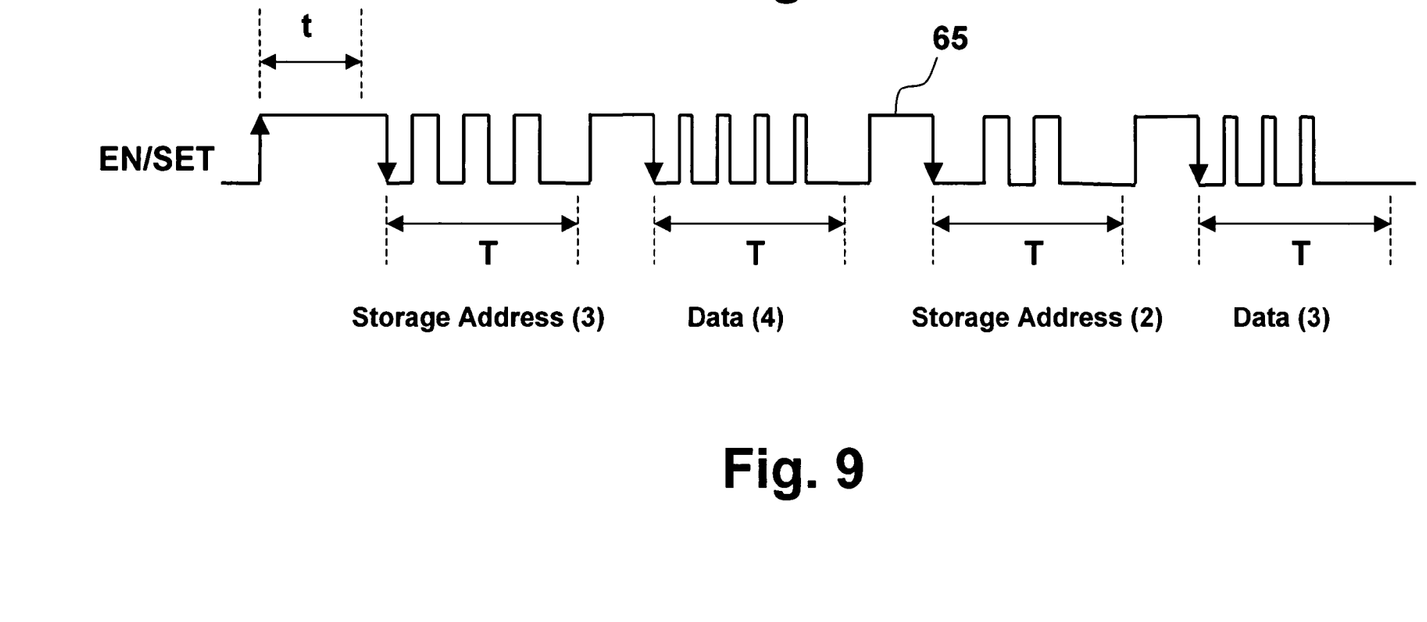
FIG. 9 shows another embodiment of the present invention.

FIG. 9 shows another embodiment. In this embodiment, the system first transmits an address in one transmission period, and next transmits data corresponding to the address in the next transmission period. Because the register address is defined in the transmission, it is not necessary to transmit data in accordance with the sequential order of the register addresses. As shown in the figure, the system transmits data "4" to the storage address (3) in the first and second transmission periods T, and it transmits data "3" to the storage address (2) in the third and fourth transmission periods T, wherein the "address" and the "data" are defined by two transmission periods respectively. As for how the receiver side distinguishes whether it is an address or data that is being transmitted presently, there are various ways. As one example which is shown in the figure, a time period t can be counted starting from a rising edge of the EN/SET signal. When the EN/SET signal stays in the high level longer than this predetermined time limit t, it indicates that the information transmitted after the next falling edge is an address, followed by data, and it goes on in the format of "address", "data", "address", "data", etc. As another example, to further ensure accuracy of information decoding, a signal t can be provided prior to transmitting each address, that is, to prolong the EN/SET signal so that it stays at the high level longer than the predetermined time limit t in the segment 65, to ensure that the receiver side recognizes the information to be transmitted in the next transmission period as an address.

Figure 10:
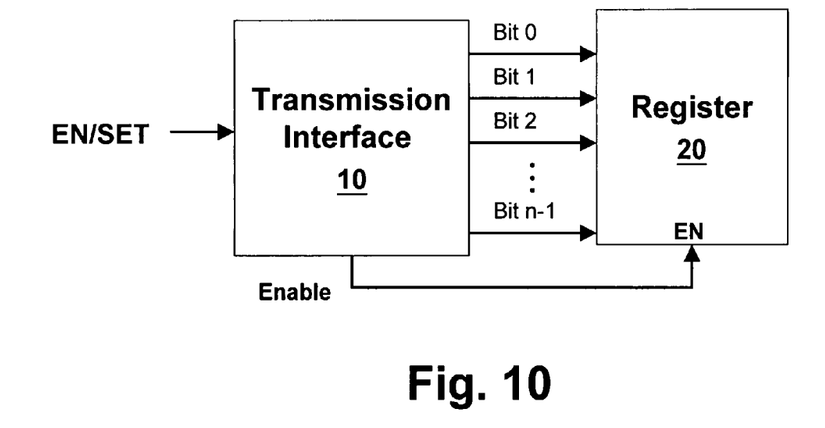
FIG. 10 and FIG. 11 show yet another embodiment of the present invention.
Figure 11:
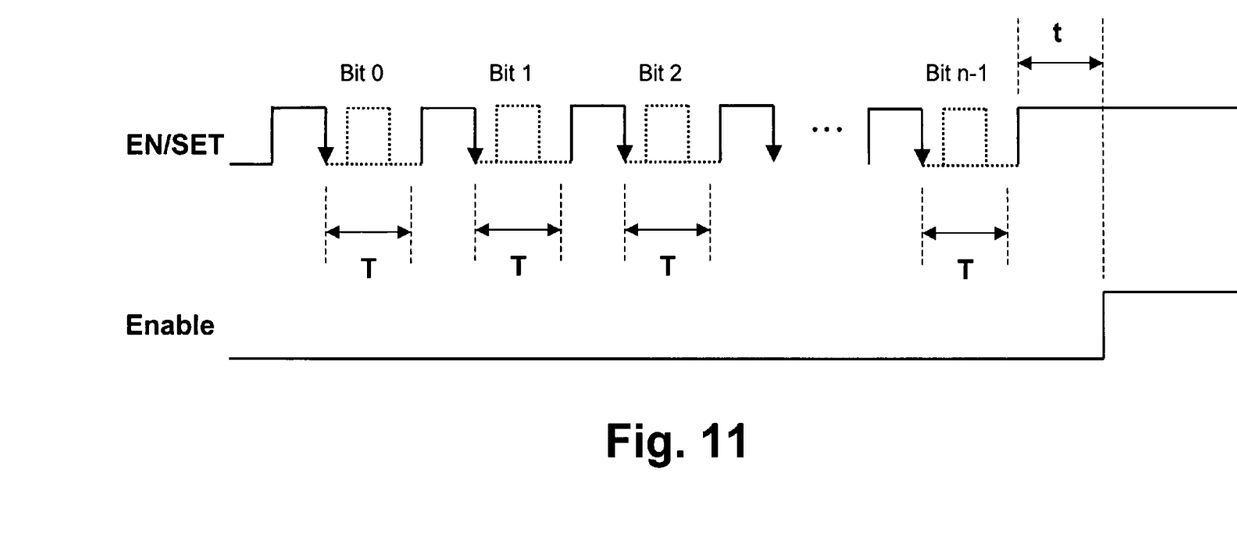

Please refer to FIG. 10 in conjunction with FIG. 11. In this embodiment, the transmission interface 10 (or its decoder 12) transmits information to the register 20 in a serial-in-parallel-out manner. The EN/SET signal transmits data of n binary bits (bit0 to bit(n−1)) in n transmission periods, and next the EN/SET signal stays high for a period longer than a predetermined time limit t. The transmission interface 10 decodes the EN/SET signal, and latches the data bit0 to bit(n−1) on corresponding transmission wires. However, the register 20 does not begin to receive such data yet, until the transmission interface 10 generates an enable signal Enable when or after the EN/SET signal stays high for a period longer than the time limit t. The register 20 is then enabled to receive the data bit0 to bit(n−1) in parallel.

Figure 12:
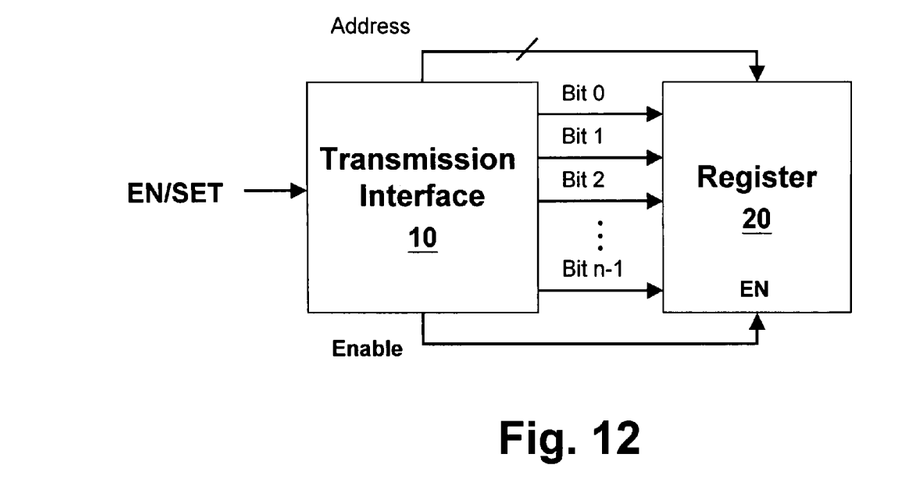
FIG. 12 and FIG. 13 show yet another embodiment of the present invention.

Comparing FIG. 11 with FIG. 9, it can be seen that the time limit t has two different functions in these two embodiments. However, the two functions ("defining the address" and "enabling the register 20") do not conflict with each other. Referring to FIG. 12 in conjunction with FIG. 13, this embodiment combines the protocols of both of the above mentioned embodiments. When the EN/SET signal stays high for a period longer than the predetermined time limit t, the transmission interface 10 generates an enable signal Enable, and recognizes that the information transmitted after the next falling edge is an address (in this embodiment, an address (3)). The information transmitted after the further next falling edge is recognized as data, i.e., bit0 to bit(n−1). Afterward, when or after the EN/SET signal stays high for a period longer than the predetermined period t again, the data bit0 to bit(n−1) are written into the address(3) of the register 20. Certainly, the decoder 12 of the transmission interface 10 may need to convert the address (3) to a binary code so as to transmit the address (3) to the register 20 through an address transmission wire.

Figure 13:
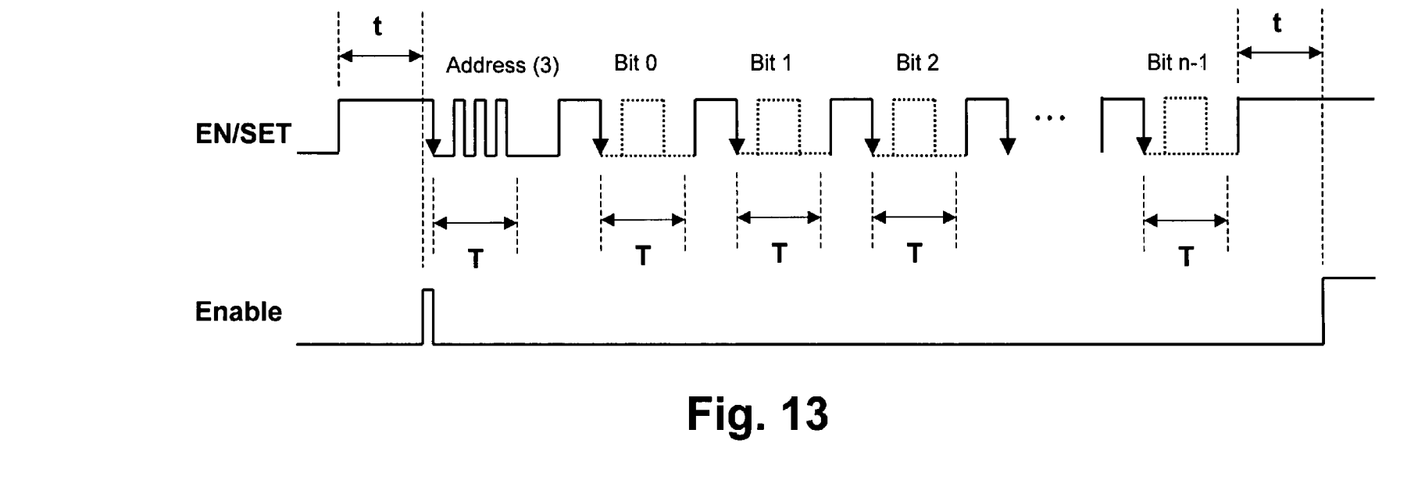

As the register usually has less number of addresses than the data content (e.g., the register may have 24 addresses but the data is an 8-digit number), the protocol shown in this embodiment may be one of the efficient ways to transmit information, that is, to express the address by the number of occurrences of the high level in the EN/SET signal in one transmission period, and express the data by binary codes in multiple transmission periods.

Figure 14:
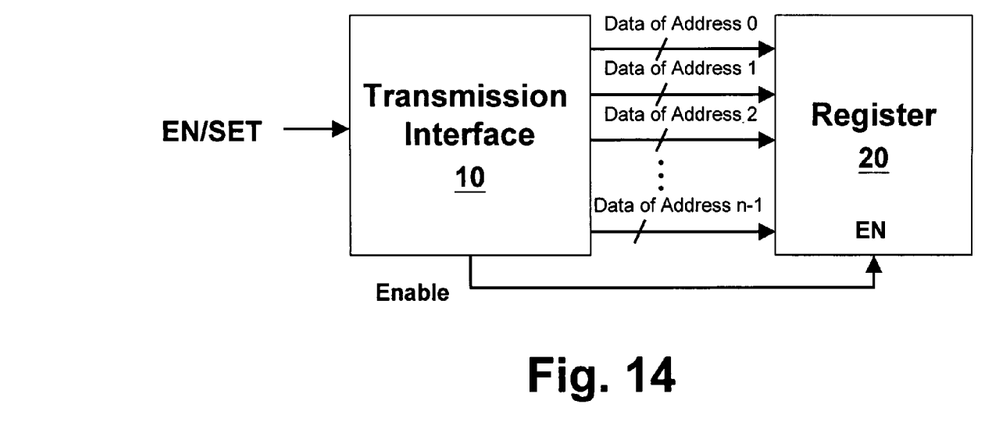
FIG. 14 and FIG. 15 show yet another embodiment of the present invention.
Figure 15:
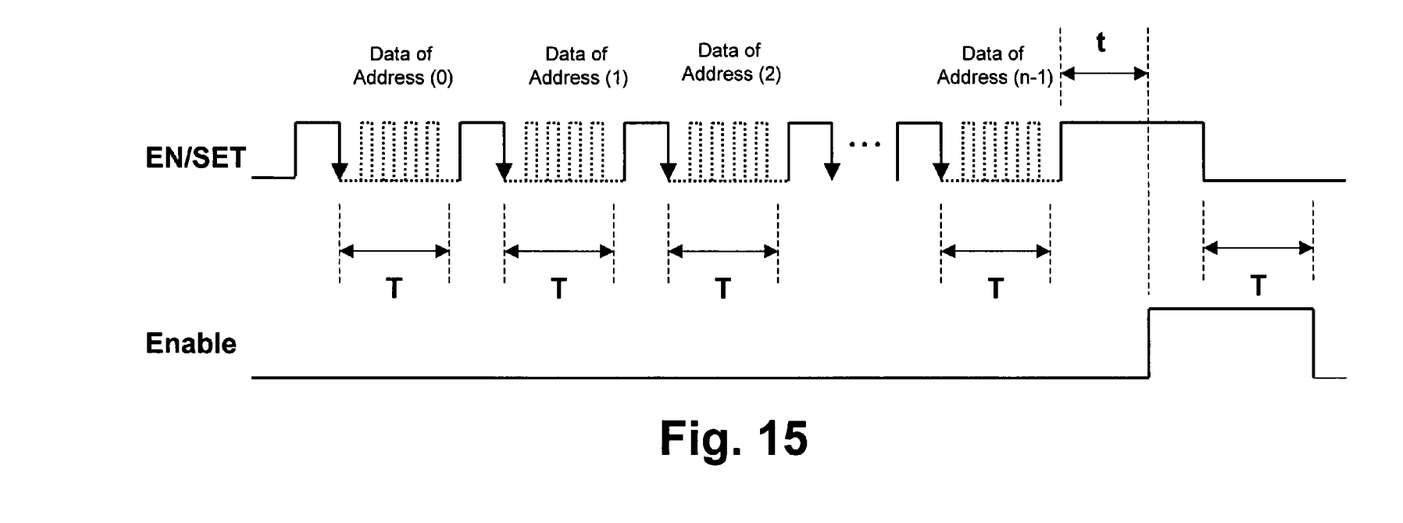

Referring to FIG. 14 in conjunction with FIG. 15, in this embodiment, the transmission interface 10 transmits data to multiple register addresses through transmission wires in a sequential order. This embodiment is similar to the embodiment in FIG. 8, except that the register 20 receives multiple data in parallel when it is enabled. Note that during the time period when the register is enabled, the falling edge of the EN/SET signal is not regarded as a start of a transmission period, to avoid confusion. When the EN/SET signal stays low for a period longer than the time period T, the enable signal Enable is reset to the low level; thereafter, the falling edge of the EN/SET signal is regarded as the start of a transmission period. The purpose of such arrangement is to ensure that the enable signal Enable lasts sufficiently long to provide enough time for data to be written into the register 20. If there is no such concern, the enable signal Enable can certainly go back to the low level following the falling edge of the EN/SET signal, as shown in the left side of FIG. 13.

Figure 16:
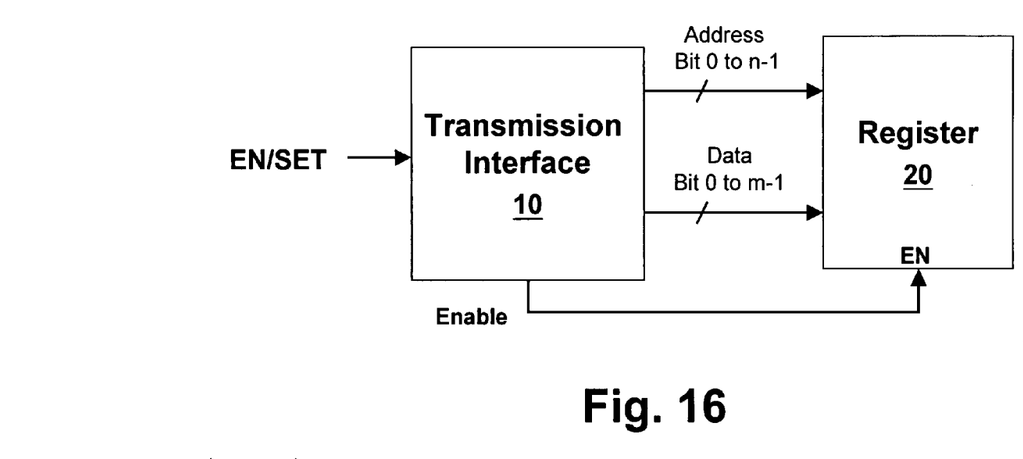
FIG. 16 and FIG. 17 show yet another embodiment of the present invention.
Figure 17:
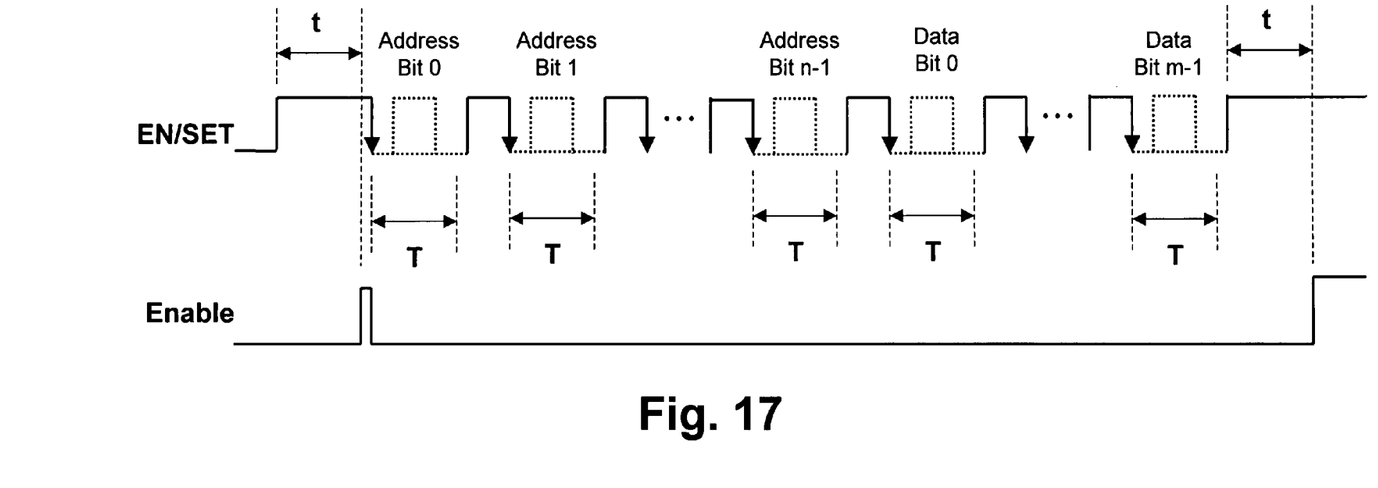

Please refer to FIG. 16 in conjunction with FIG. 17. This embodiment is similar to the embodiments in FIG. 12 and FIG. 13, but the EN/SET signal defines both address and data by binary codes. As shown in the figure, when or after the EN/SET signal stays high for a period longer than a time limit t, the decoder 12 of the transmission interface 10 recognizes that the signal format of the next transmitted information is n-bit address and m-bit data, so it decodes the signal in the following n+m transmission periods accordingly, and latches the decoded information in the address transmission wire and the data transmission wire. Next, the EN/SET signal is pulled up to the high level and stays high for a period longer than the time limit t. Hence, the transmission interface 10 issues an enable signal Enable to enable the register 20 to write the data to the designated address.

In each of the foregoing embodiments, the transmission time period T of any information (including address and/or data) is fixed, and the time required for a receiver side to receive a complete information series ("address"+"data") is also fixed. Accordingly, the present invention is more convenient to many applications.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the definitions of the high and low levels in each embodiment can be switched. As another example, FIG. 3 shows that the counter 14 receives the EN/SET signal through the decoder 12 and starts counting, but the counter 14 can receive the EN/SET signal directly, not through the decoder 12. In view of the foregoing, the spirit of the present invention should cover all such and other modifications and variations, which should be interpreted to fall within the scope of the following claims and their equivalents.

What is claimed is:

1. A single-wire transmission interface comprising:
   a decoder receiving a single-wire signal from a single-wire and generating decoded information corresponding to the single-wire signal; and
   a counter determining a fixed transmission period having a predetermined constant length for transmitting an address or a data by counting a fixed first time period according to one of a rising and a falling edge of the single wire signal, wherein the fixed transmission period starts when the fixed first time period starts;
   wherein the decoder operates to generate decoded information only in the transmission period.

2. The single-wire transmission interface of claim 1, wherein the counter counts the fixed first time period according to the falling edge of the single-wire signal.

3. The single-wire transmission interface of claim 1, wherein the decoder generates decoded binary information in the transmission period.

4. The single-wire transmission interface of claim 1, wherein the decoder, generates decoded information according to an occurrence of a level in the single-wire signal in the transmission period.

5. The single-wire transmission interface of claim 1, wherein the counter counts a fixed second time period according to the other one of the rising and the falling edge of the single wire signal.

6. The single-wire transmission interface of claim 5, wherein if the single-wire signal does not change its level in the second time period, the decoded information generated in the next transmission period after the end of the second time period is an address.

7. The single-wire transmission interface of claim 5, wherein the decoder is coupled to a register; wherein the decoder latches the decoded information in an output wire to the register, and if the single-wire signal does not change its level in the second time period, the single-wire transmission interface generates an enable signal to enable the resister when or after the second time period ends.

8. The single-wire transmission interface of claim 1, wherein the decoder is a serial-in-parallel-out device which outputs the information generated in multiple transmission periods in one parallel output.

9. The single-wire transmission interface of claim 1, wherein an information series generated by the decoder in multiple transmission periods includes the address and the data.

10. The single-wire transmission interface of claim 9, wherein the address and the data are determined by occurrences of a level in the single-wire signal in corresponding transmission periods, respectively.

11. The single-wire transmission interface of claim 9, wherein the address is determined by an occurrence of a level in the single-wire signal in one of the transmission periods, and the data is determined by decoded binary information generated in other multiple ones of the transmission periods.

12. The single-wire transmission interface of claim 9, wherein the address is determined by decoded binary information generated in multiple ones of the transmission periods, and the data is determined by decoded binary information generated in other multiple ones of the transmission periods.

13. The single-wire transmission interface of claim 1, wherein the decoder is coupled to a register, and wherein the decoder transmits data to a different address in the register in a sequential order in each of multiple transmission periods.

14. A method of transmission through single-wire, comprising:
   providing a single-wire signal through a single wire; and
   transmitting information only in a fixed transmission period defined by a fixed first time period starting from or after one of a rising and a falling edge of the single-wire signal, wherein the fixed transmission period has a predetermined constant length and the fixed transmission period starts when the fixed first time period starts.

15. The method of claim 14, wherein the step of transmitting information includes: indicating binary information by a level of the single-wire signal.

16. The method of claim 14, wherein the step of transmitting information includes: indicating information by an occurrence of a level in the single-wire signal.

17. The method of claim 14 further comprising:
   transmitting information to a circuit receiving the single-wire signal, wherein the information is transmitted to a different address of the circuit in a sequential order in each of multiple transmission periods.

18. The method of claim 14, further comprising:
transmitting an information series in multiple transmission periods, wherein the information series includes an address and a data.

19. The method of claim 18, wherein the address and the data are indicated by occurrences of a level in the single-wire signal in multiple transmission periods, alternatively.

20. The method of claim 18, wherein the address is indicated by an occurrence of a level in the single-wire signal in one of the transmission periods, and the data is indicated by binary information transmitted in other multiple ones of the transmission periods.

21. The method of claim 18, wherein the address is indicated by binary information transmitted in multiple ones of transmission periods, and the data is indicated by binary information transmitted in other multiple ones of the transmission period.

22. The method of claim 14 further comprising:
maintaining a level of the single-wire signal in a fixed second time period starting from or after the other one of the rising and the falling edge of the single-wire signal to indicate that the information transmitted in the next transmission period is an address.

23. The method of claim 14 further comprising:
maintaining a level of the single-wire signal in a fixed second time period starting from or after the other one of the rising and the falling edge of the single-wire signal, such that a circuit receiving the single-wire signal generates an enable signal accordingly.

* * * * *